Sept. 25, 1962 G. D. HENDRICKS 3,056,106
INFRARED DETECTORS
Filed July 14, 1958 3 Sheets-Sheet 1

INVENTOR.
G. DONALD HENDRICKS
BY
Bruno C. Lechler
Attorney

Sept. 25, 1962   G. D. HENDRICKS   3,056,106
INFRARED DETECTORS
Filed July 14, 1958   3 Sheets-Sheet 2

INVENTOR.
G. DONALD HENDRICKS
BY
Bruno C. Lechler
Attorney

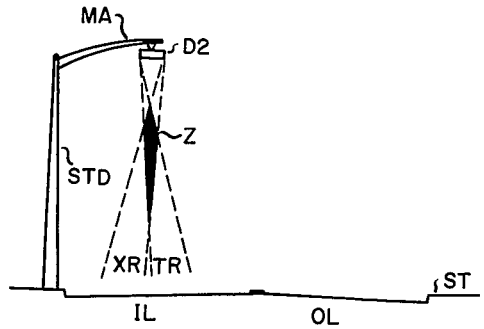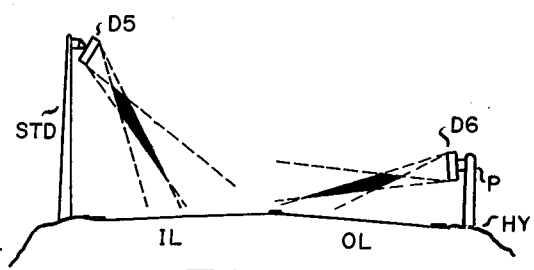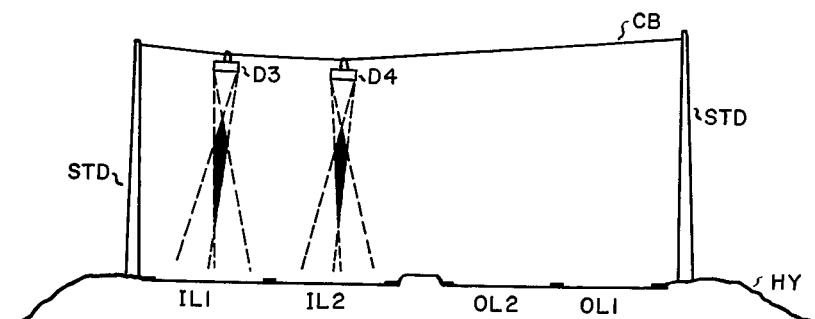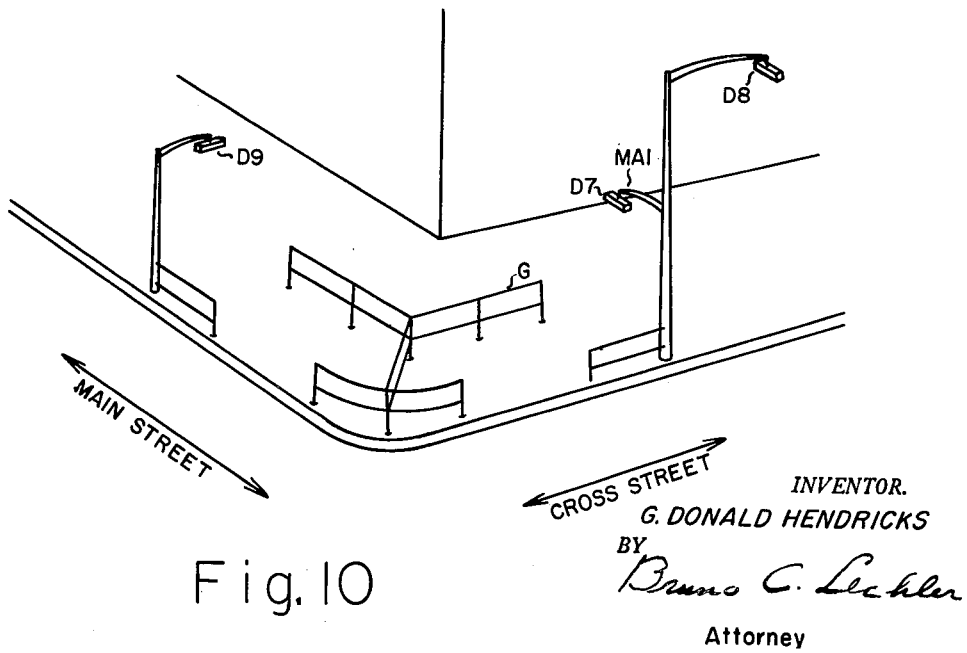

United States Patent Office 3,056,106
Patented Sept. 25, 1962

3,056,106
INFRARED DETECTORS
George Donald Hendricks, Campbells Island, Ill., assignor, by mesne assignments, to The Gamewell Company, Newton, Mass., a corporation of Delaware
Filed July 14, 1958, Ser. No. 748,198
2 Claims. (Cl. 340—31)

This invention relates to infrared traffic detection devices and particularly to devices useful in the detection of moving or standing vehicles for traffic control purposes.

In the field of traffic control it is presently unknown how to detect the presence of a vehicle stopped at an intersection except with costly, highly complicated, ultra high frequency radar equipment. Examples of such contemporary equipment are found in United States Patents 2,477,567, 2,521,683, and 2,540,089. Apparatus of this type has been marketed for a number of years but has not received wide acceptance because of its complex circuitry and the need for highly skilled technical personnel to maintain it. This, in spite of its obvious advantage of being installed aerially with no trenching or breaking of pavement as is required for the installation of the more commonly used detectors. The present invention has all the advantages of aerial installation plus the advantages of simple, easily maintained, circuitry. The present device may be built with solid state components and printed circuits which would make it virtually maintenance-free.

While only one system (the radar system) has been developed to detect the presence of a vehicle stopped at an intersection, many systems have been developed to detect the movement of a vehicle approaching an intersection. Two general methods finding wide application employ magnetic or pressure sensitive detectors mounted in the roadway in the approaches to the intersection. Examples of these two types of detectors are disclosed in United States Patents 2,201,146 and Re. 18,507, respectively.

The magnetic detector depends on motion of the vehicle through the earth's magnetic field to operate the detector. The pressure sensitive detector depends on the weight of the vehicle passing over the detector and depressing the pad to close an electric circuit. Standard practice is to deploy the detectors back from the intersection a distance sufficient to permit timing a traffic change interval to the other street when a vehicle approaches and actuates the detector. Only by placing the detector back from the intersection can the timing interval be sufficient to preclude delaying the vehicle.

A plurality of pressure sensitive detectors could be installed near the intersection to detect presence of a vehicle stopped at the intersection. The number of detectors required in each street would be high, approximately one per foot of distance to be detected in each lane. One or more detectors may be required ahead of the pedestrian line to detect vehicles stopped ahead of the stop line. It is estimated that approximately ten detectors of the type in use today would be required to give adequate coverage in each lane. It is obvious that the cost of installation and maintenance would be prohibitive.

Adequate detection of moving vehicles can be obtained with magnetic detectors installed under the roadway near the intersection. However, as soon as a vehicle slows considerably or stops, its detection is impossible magnetically.

Various systems employing the photo electric principle have also been devised. Since they require a light source across the street, the beam is interrupted by traffic on the opposite lane. By installing the light source in an island between traffic lanes this problem is avoided. However, few streets are equipped with islands. The photo electric system for vehicular traffic detection and control has not found wide acceptance.

The radar equipment disclosed in the patents named above is further complicated because it was designed primarily to measure the speed of an approaching vehicle. The present invention is primarily a presence or movement detector and is not concerned with speed measurement. This contributes to its simplicity. The present invention is intended to be used with semi-actuated or full-actuated controllers and with traffic density computers and need only give a signal while a vehicle is in its detected area. It may be further simplified to give a momentary signal as a vehicle enters the detected area, with the signal cut off if the vehicle stops in the area. Such an arrangement would constitute a movement detector and not a presence detector.

Summarizing, the present invention will compete in cost with the more simple magnetic or pressure type detectors and will equal the radar vehicle detector in installation simplicity.

The present invention has the advantage of the radar system in that it may be mounted overhead and does not require breaking of pavement to install. It has the added advantage of simplicity, ease of maintenance, use of standard components, and low cost. Because it employs a simple amplifier circuit it can be maintained by the average radio technician. It can be designed to use solid state components which have inherent long life and are stable at high ambient temperatures. It has none of the disadvantages of a high cost, highly complicated, radar installation. Since it does not employ electromagnetic radiation it does not fall under the jurisdiction of the Federal Communications Commission nor require FCC license or channel allocation.

Infrared detection systems are of two general types: active and passive. The active system employs an infrared source and directing apparatus, and an optic pickup, concentrating and detecting apparatus. The passive system employs only the latter apparatus. The type of system employed usually depends upon the level of radiation of the object detected: highly radiant objects may be detected with a passive system, low radiant (and highly reflective) objects may require an active system.

One form of the present invention provides a temperature and ambient radiation compensated infrared detector capable of sensing the radiant energy emitted by a passing or stopped vehicle. This form employs no primary source of radiant energy, the detected vehicle being the source of energy. Another version employs a low wattage modulated radiator directed at the object to be detected, the object reflecting a portion of the radiant energy. In both versions the radiant energy is picked up, amplified, and used to energize a relay device.

The infrared detector system as disclosed herein has been made more reliable and less susceptible to spurious radiation from undesirable sources within its viewing range. By providing an active system employing a modulated infrared source and a frequency responsive receiver, and by providing suitable apertures in the transmitter and receiver optic systems, the performance of the detector has been enhanced. Further, by directing the transmitted wave in a conical pattern toward the area being detected, and by aiming the receiver in a partially overlapping conical pattern with the overlap occurring above the pavement, the spurious effect of solar radiation from the pavement is eliminated.

Another form of the invention employs a phase difference detection circuit to compare the phase angle of a transmitted wave with the phase angle of a received wave. When no signal or spurious signal is received, they would be out of phase and cause the phase detection bridge to draw current. When a true signal is reflected from an object in the detected area the waves would be in phase and cause the bridge to balance and reduce conduction. The effect is used to signal a traffic controller.

One form of the invention particularly adapted to the detection of vehicular traffic on a roadway consists of a detector unit mounted above the roadway. The unit may be suspended from an overhead cable or from a mast arm. A gate means is provided to restrict the aperture of the lens system to detect traffic in a single lane or a combination of lanes. At some installations, a single detector unit could detect all traffic approaching the intersection from one direction in one or more lanes. However, by restricting the field of detection, traffic in only one lane can be detected, with a unit provided for each lane to be detected. In this manner, individual counts may be obtained for traffic in lanes intended for left turns, right turns, or through traffic.

Both the active and the passive forms of the invention are possible with the unit mounted overhead. The active system employs an infrared source and an optic system within the unit to direct a conical pattern of radiation down toward the roadway. Vehicles passing through the conical pattern reflect varying amounts of infrared. Some of the reflected energy is picked up by the optic pickup system which scans an overlapping conical pattern under the detector. The reflected energy is amplified and detected in a bridge detector circuit causing a relay to be deenergized. Contacts on the relay feed a signal to the traffic controller. To prevent extraneous or ambient energy from actuating the detector the primary source is modulated at a frequency not commonly found in the environment. The bridge detector responds to energy of only that frequency, thus reducing the effect of spurious signals. Since the patterns of emission and reflection overlap above the pavement, radiation from the pavement is not detected.

The passive overhead system detects the infrared energy emitted by vehicular traffic. It does not employ its own primary source; the vehicle serves as a primary source. While it is simpler than the active system it is less reliable because it may be actuated by stray radiation.

Thus, the present invention combines known optic systems with known infrared detectors, known amplifiers and phase shift detectors in a novel form and relationship and in a new application—the detection of moving or halted vehicular or pedestrian traffic.

The range of spectrum available is from 0.75 to 300 microns wave length. The portion used is from 0.75 to 3 microns (7,500 to 30,000 Angstroms) conforming to detector cell sensitivity. The invention is not limited to this range of wave lengths because with different or improved detection devices the useful range of the spectrum could be extended.

The principal object of the invention is to provide an infrared detection and amplification apparatus suitable for detecting the presence and movement of vehicles.

Another object of the invention is to provide an infrared detector circuit to pick up modulated radiant energy, to amplify only a change in detected modulated energy, and thereby to energize or deenergize a control device.

Another object of the invention is to provide a modulated infrared source and a detector circuit to detect only modulated reflected infrared.

Another object of the invention is to provide a modulated infrared source and a detector utilizing a bridge circuit to detect only correspondingly modulated reflected infrared.

It is another object of the invention to provide a source of infrared energy modulated at a frequency not commonly found within the range of the detector.

Another object of the invention is to provide an electronic circuit utilizing two infrared detectors, one to compensate for ambient conditions.

It is another object of the invention to provide an infrared pickup employing an optic system and infrared detector, and a solid state electronic circuit for sensing changes in radiant energy received.

It is another object of the invention to provide a source of infrared energy, a low frequency oscillator to modulate the source, an optic pickup system, a low frequency filter, an amplifier, a bridge circuit and a relay deenergized by the bridge circuit.

Another object of the invention is to provide a traffic detector including an infrared transmitter and an infrared receiver mounted at opposite ends of a housing, the transmitter and receiver having overlapping areas of transmission and reception that are non-coincident at pavement level.

Another object is to provide an infrared reflection system impervious to radiation from the pavement, the system providing a cone of modulated infrared energy directed at the pavement and an intersecting cone of reception non-overlapping at the level of the pavement.

The invention will be described with reference to the following figures, in which FGURE 1 illustrates a passive infrared detector employing a lens system, an infrared detector cell, a temperature stabilizer cell, an amplifier, and a load relay.

FIGURE 7 illustrates a method of suspending the detector unit from a mast arm.

FIGURE 8 illustrates another method of suspending more than one detector unit from an overhead cable.

FIGURE 9 illustrates two methods of mounting the detector units at the side of a highway.

FIGURE 10 illustrates one method of detecting pedestrians at an intersection crosswalk.

*Temperature Compensated Passive System*

Figure 1:
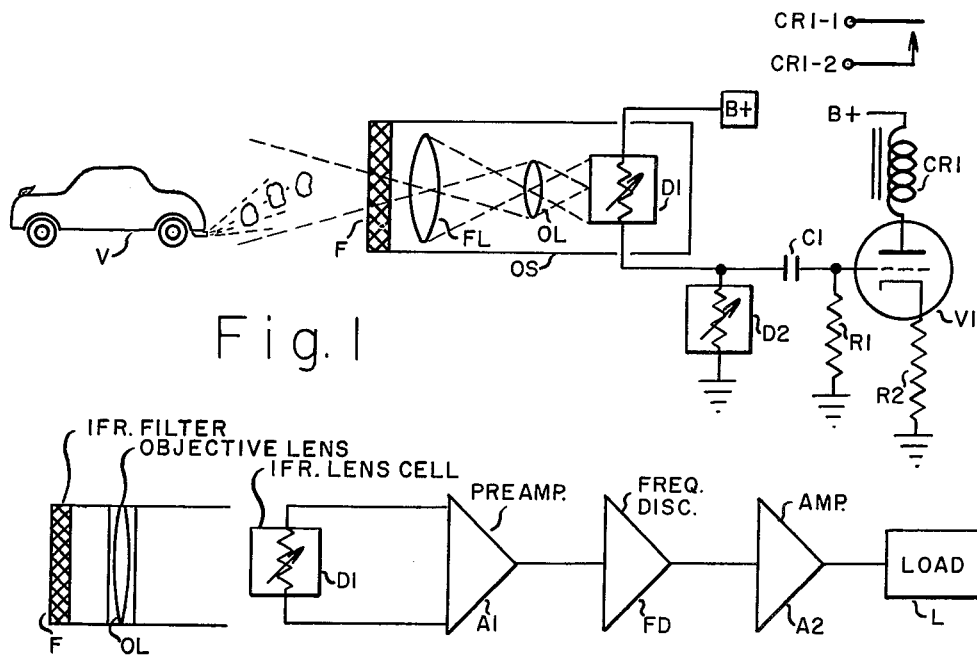

FIGURE 1 shows one simple form of a temperature compensated infrared detection system. Vehicle V is a source of infrared radiation. Its temperature is normally higher than ambient since it is driven by an internal combustion engine. Particularly radiant areas are the radiator, engine, transmission, muffler, tail pipe, differential, and exhaust gases. Moreover, the entire vehicle serves as a source of radiant energy.

The optic system OS is represented by an infrared filter F, a field lens FL, and an objective lens OL. The lens system is designed to focus the image of target V onto the detector D1 and may be slightly defocused to avoid partial saturation and the loss resulting therefrom. An attempt is made to uniformly illuminate the cell regardless of target position within the field.

A second detector D2 is placed within the same container and is exposed only to ambient temperature. It is not exposed to infrared radiation. Its purpose is to provide compensation for temperature change in resistance of detector D1.

A positive supply voltage is applied at point B+. In the quiescent state the voltage B divides across detectors D1, D2 in relation to their impedances. This voltage serves to maintain a charge on capacitor C1. The control grid of vacuum tube V1 is connected to the other side of capacitor C1. Grid leak resistor R1 is connected between the control grid and ground. Tube V1 is normally non-conducting despite the low negative or zero potential appearing on the grid side of capacitor C1. With little plate current flowing, coil CR1 is deenergized and contacts CR1–1 and –2 are open. Resistor R2 is provided as a self bias so that current flowing through tube V1 raises the positive cathode potential which makes the grid appear negative and results in cutoff of tube V1.

Arrival of vehicle V in the field of optic system OS, greatly increases the amount of infrared energy falling on lead sulfide detector D1. This causes it to heat and causes its resistance to decrease. A decrease in resistance of D1 results in a rise in voltage at the junction of D1, D2. This voltage rise causes capacitor C1 to charge further, causing an electron flow to the right side of capacitor C1 through resistor R1 increasing the positive potential of the grid. Tube V1 conducts more heavily, pulling in relay CR1. Contacts CR1–1 and –2 close, placing a call on a traffic controller or counter.

As soon as capacitor C1 has fully charged, the electron flow through resistor R1 ceases. The potential of the grid drops sufficiently to reduce conduction through tube V1, causing relay CR1 to be deenergized. Contacts CR1–1 and –2 open.

The circuit has good cutoff characteristics in that after vehicle V leaves the field of lens system OS and the impedance of detector D1 increases, the voltage of junction D1, D2 returns to normal. The positive potential on the left side of capacitor C1 is reduced and equalized by the flow of electrons away from the right side of C1. Electrons flow through grid resistor R1 to ground causing the grid of tube V1 to appear more negative, sharply reducing the conduction of tube V1.

After capacitor C1 has reached its quiescent state and electron flow has ceased through R1, self bias resistor R2 maintains conduction sufficiently low to prevent relay CR1 from pulling in.

Changes in ambient temperature affect the resistance of infrared detectors D1, D2 relatively the same. Since they are connected as a voltage divider, the voltage at their junction changes only slightly with wide fluctuations in temperature.

Many modifications and embellishments can be made to this circuit. Some of these are shown in the accompanying figures.

*Frequency Discriminator*

In some locations spurious infrared radiation may make the detector of the type illustrated in FIGURE 1 difficult to apply. To prevent infrared interference from falsely actuating the detector and its load device the circuit shown in FIGURE 2 may be employed.

Figure 2:
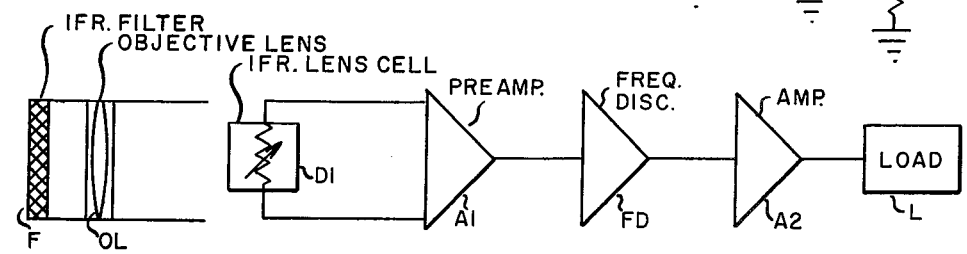
FIGURE 2 illustrates a passive infrared detector employing a lens system, an infrared sensitive cell, a pre-amplifier, a frequency discriminator, an amplifier, and a load device.

The circuit shown in block diagram in FIGURE 2 utilizes a frequency discriminator FD between a preamplifier A1 and an amplifier A2. The infrared sensitive cell D1 is placed near the focal point of an optic system comprised of an infrared filter F and an objective lens OL. Load L is energized through amplifier A2 when energy of th proper wave length and modulation falls upon cell D1.

It has been found that the infrared radiation from a vehicle driven by an internal combustion engine is somewhat modulated. This modulation has been estimated to be in the range of approximately 30 to 300 cycles per second. The band pass filter of the frequency discriminator FD is designed to pass these frequencies and to block other frequencies.

As the design of vehicles changes, and as their mode of propulsion changes, it is envisioned that the range of modulation may likewise change. Anyone skilled in the art could make such adjustment or modification to the band pass filter within frequency discriminator FD.

A more detailed description of the circuit elements will be found in a later section.

*Detector Amplifier*

Figure 3:
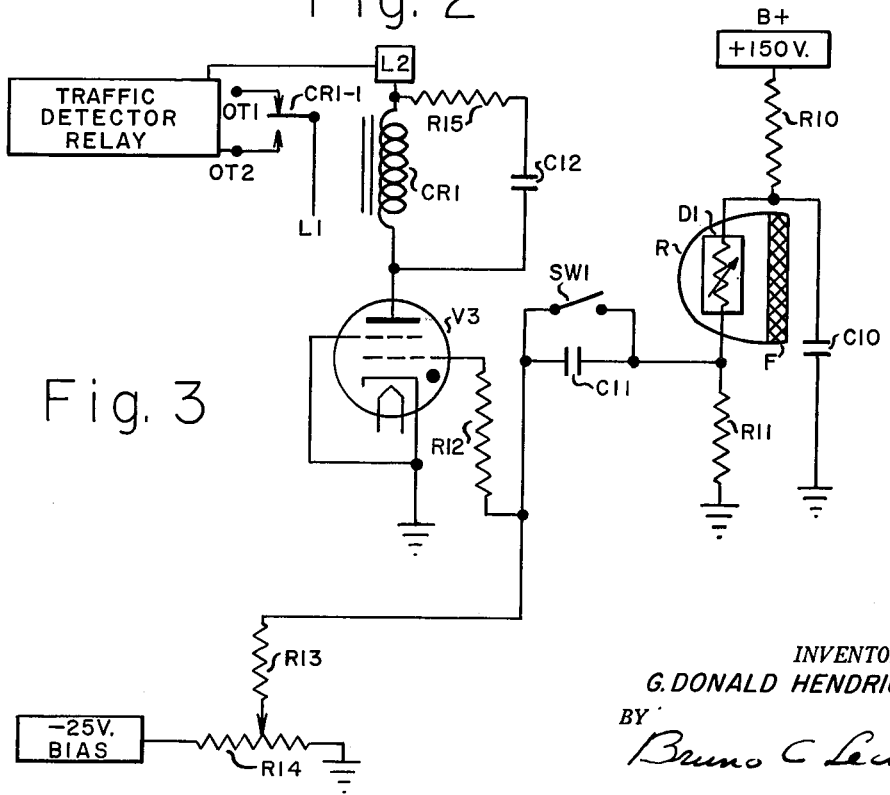
FIGURE 3 illustrates a passive infrared detector employing a lens system, a detector cell, an amplifier, a load relay, and a traffic detector relay.

Another form of passive infrared detector and amplifier is shown in FIGURE 3. The lead sulfide cell D1 is located near the focal point of parabolic reflector R. The reflector R is gold plated in the preferred embodiment but may be aluminum or any other good reflector of infrared. An infrared filter F may be used to block out visible light but its use is optional and depends on the type of detector cell used. An aperture may be employed to reduce the field of view of the optic system.

The cell D1 is connected between two resistors R10 and R11. Resistor R10 is connected to a positive power supply B+ of 150 volts. Resistor R11 is connected to ground. Capacitor C10 is connected across cell D1 and resistor R11 and assumes a constant charge, serving as a filter.

A thyratron is represented by V3. Its screen grid and cathode are connected together and to ground. Its control grid is connected to an adjustable negative bias voltage source through resistors R12, R13. A potentiometer R14 serves as a bias voltage adjustor and is connected between a negative potential source —25 v. and ground. The circuit combination supplies a bias voltage just sufficient to prevent conduction while the cell D1 is quiescent.

Coupling capacitor C11 is connected between the junction of resistors R12, R13 and the junction of cell D1 and resistor R11. Any reduction in resistance of cell D1 caused by infrared energy falling on said cell results in a voltage rise at R11 establishing a new level toward which capacitor C11 charges. An electron flow from ground through part of resistor R14, through resistor R13, to charge capacitor C11 makes the grid voltage on V3 less negative or more positive and permits conduction through tube V3 and the coil of relay CR1.

The coil of relay CR1 is connected between an A.C. power supply terminal L2 and the plate of tube V3. Connected across coil CR1 is a resistor-capacitor combination R15, C12 which maintains current flow through the coil for an instant after its source is removed thus insuring chatter-free operation. Normally open contacts CR1–1 are connected between L1 and any load device, in this embodiment the traffic detector relay in a traffic controller. Output terminals are OT1, OT2.

With the control grid voltage made more positive by a decrease in resistance of cell D1 because of higher infrared radiation thereon, tube V3 conducts. The path of electron flow is from ground, through the cathode of tube V3 to the plate of V3, through coil CR1 to the L2 power supply. Relay CR1 will be energized, closing contacts CR1–1 and closing the detector circuit of the traffic controller. During the half cycle that terminal L2 is negative, no current can flow through tube V3 in the reverse direction. Current is maintained through coil CR1 from capacitor C12.

Continued arrival of infrared energy on the surface of cell D1 continues to result in low resistance of the cell. However, after capacitor C11 charges through resistor R13 it has no continuing effect on the grid voltage and tube V3 is cut off after the first negative half cycle of line L2. Thus, with the circuit as shown in FIGURE 3, closure of contacts CR1–1 is momentary. In a traffic detector application this would act like a magnetic traffic detector which depends upon motion of a vehicle for its output. Or it might appear as a pressure sensitive detector set back from the intersection with vehicles moving over it actuating it momentarily. It would not appear as a pressure sensitive detector with a vehicle stopped on the pad, resulting in continued closure of the circuit.

Switch SW1 is connected across capacitor C11. Its purpose is to change the operation of the detector circuit. With switch SW1 open as shown in FIGURE 3, the operation of the detector will be as described above. With switch SW1 closed, the operation of the detector will be changed. That is, with switch SW1 closed continued arrival of infrared energy on the surface of cell D1 continues to hold the grid potential sufficiently positive to permit tube V3 to conduct continuously. Load relay CR1 being energized continuously, closes contacts CR1–1 as long as sufficient infrared energy impinges on cell D1.

The unit acting thusly would appear as an extensive presence detector, closing the detector circuit as long as a vehicle remained in the filed of view. A vehicle stopped at an intersection for any reason would continue to make its presence known. This is a distinct improvement over present detector systems.

*Transistorized Amplifier*

Figure 4:
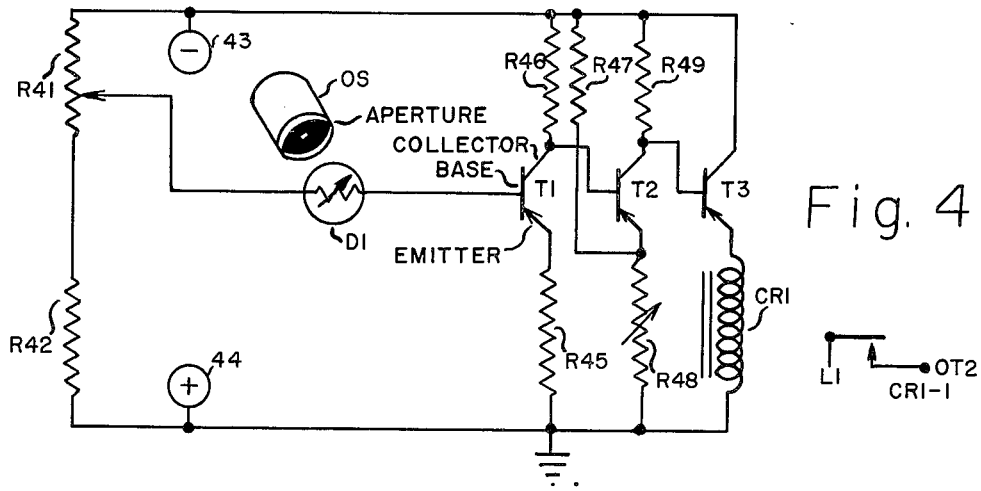
FIGURE 4 illustrates an infrared detector including optic pickup, aperture, detector, a three stage transistorized amplifier, and load relay.

FIGURE 4 is a wiring diagram of a three stage transistorized infrared detector amplifier.

A lead sulfide cell is represented at D1. Any of the well known detectors whose resistance changes with incident infrared energy may be used. An optic system OS may be employed to limit the field of view of the detector and to converge and concentrate the energy.

The cell D1 acts as a variable resistor of very high impedance with no energy arriving and low impedance with high energy arriving.

A voltage divider consisting of potentiometer R41 and resistor R42 is connected betwen negative and positive power supply terminals 43, 44. One lead from cell D1 is connected to the center tap of potentiometer R41. The other lead from cell D1 is connected to the base of transistor T1. Transistor T1 is of the PNP type. Its emitter is connected to the positive power supply 44 through resistor R45. Its collector is connected to the negative power supply 43 through resistor R46 and to the base of transistor T2.

An increase in infrared energy falling on cell D1 causes an increase in base current resulting in an increase in collector current through transistor T1. An increase in current flowing in resistor R46 causes an increase in voltage drop across resistor R46. The increase in current flowing through transistor T1 from collector to emitter reduces the amount of current normally flowing from the collector of transistor T1 to the base of transistor T2. This in effect cuts off transistor T2.

The emitter of transistor T2 is connected to the junction of resistor R47 and variable resistor R48 which are connected in series and connected between the negative and positive power supplies 43, 44. The collector of transistor T2 is connected to the negative power supply 43 through resistor R49.

Normally, with little infrared energy incident on cell D1, the amplifier is in a quiescent state with little current flowing through transistor T1. Current flows from the negative power supply 43, through resistor R46 to the base of transistor T2, from the emitter of T2, through variable resistor R48 to the positive power supply 44. Resistor R48 is adjusted to permit the proper amount of current to flow through T2, depending on transistor characteristics.

With a relatively heavy base current flowing through T2, a larger current flows through the collector-emitter circuit of T2. Little current is available for the base of transistor T3, and thus little load current flows through T3 and the load coil CR1.

A decrease in base current flowing through transistor T2 results in a decrease in collector-emitter current through T2 and resistor R49. Resistor R49 is connected between the negative power supply 43 and the collector of T2. The collector of T2 is also connected to the base of T3.

The collector of transistor T3 is connected to the negative power supply 43. The emitter of T3 is connected to the positive power supply 44 through the load coil CR1.

Normally, with heavy collector current flowing in T2, little current flows to the base of T3. With little base current in T3 very little collector-emitter current flows through T3 and load coil CR1 located in its emitter circuit.

A decrease in current flowing through transistor T2 resulting from an increase in infrared energy incident on cell D1 results in an increased base current for T3. An increased base current results in increased collector-emitter current flowing through transistor T3 and load coil CR1.

Thus, increases in the level of infrared energy impinging on the surface of cell D1 are amplified in transistor stages T1, T2, and T3 causing an increase of current flow through load coil CR1. Coil CR1 is in this embodiment a relay coil which when energized closes contacts CR1–1 applying ground potential L1 to output terminal OT2. In this embodiment a detector relay whose other side is connected to a supply potential is connected to terminal OT2 and is pulled in when relay CR1 is energized. Thus, a change in infrared energy incident on cell D1 actuates a detector relay in a traffic controller mechanism.

*Modulated System*

Figure 5:
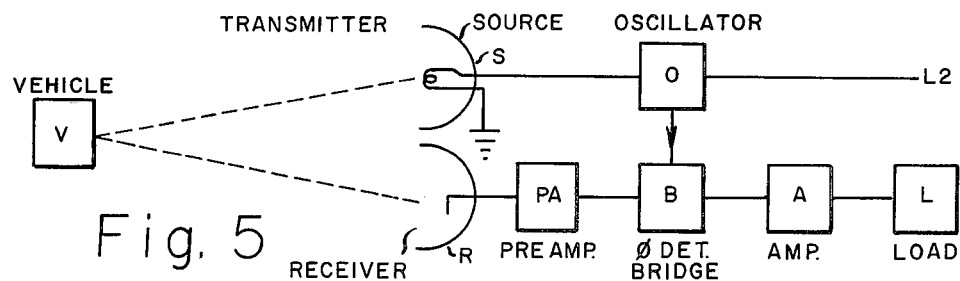
FIGURE 5 is a block diagram of an active infrared detector employing an oscillator, a modulated infrared source and reflector, a vehicle target, and a receiver utilizing an infrared detector cell, a pre-amplifier, a phase difference detector circuit, a second amplifier, and a load device.

A schematic diagram of the preferred embodiment of an active, modulated, phase detection infrared system is shown in FIGURE 5. The infrared transmitter consists of a source whose output is modulated by a low frequency oscillator O and directed at the highway lane on which a vehicle V is to be detected. The modulating frequency is also fed to a phase detection bridge B in the receiver.

The receiver consists of a detector cell and an optic collecting and focusing reflector R, a preamplifier PA, a phase detection bridge circuit B, another amplifier A, and the load L.

The infrared source may be any suitable source of radiation and in this embodiment consists of an incandescent bulb of proper voltage and wattage. The bulb may be operated at reduced voltage to prolong its life. Power to illuminate the bulb is received from a single tube oscillator circuit adjusted to oscillate at some frequency other than 60 cycles, the prevalent power frequency. Stray and reflected radiation originating from 60 cycle electric powered sources is filtered out in the receiver. In this embodiment a frequency of 45 to 55 c.p.s. has been found successful. In areas of the country where power frequencies other than 60 c.p.s. are employed, a correspondingly different oscillator frequency may be used. A frequency lower than 60 c.p.s. is desirable because it permits a greater percent modulation. At the lower frequencies a greater percent modulation is possible because the filament has time to cool between cycles.

An infrared filter (not shown) may be employed in front of the parabolic transmitter reflector to block out visible light. A similar filter may be employed in front of the receiver reflector. Both transmitter and receiver are focused on the same general area of highway lane to permit the receiver to pick up infrared energy reflected from any vehicle V passing or stopped thereon. The area of overlap may terminate above the pavement to prevent seeing and registering changes of incident radiation from the pavement.

One or more stages of preamplification may be imposed between the receiver cell and the phase detection bridge circuit. The change in resistance of the cell is converted to a greater change in potential in the preamplifier. A filter circuit may be employed ahead of the preamplifier to pass frequencies near the modulating frequency and to block all spurious frequencies.

In the phase detection circuit any difference in phase relationship between the transmitted and received wave is detected. The reference frequency from the oscillator is fed to one portion of the bridge and the received frequency from the cell and preamplifier is fed to the other portion of the bridge. The device is adjusted to a null position with a vehicle in the observed area. No vehicle in the area results in a change in the phase relationship between the received and transmitted waves; this difference is sufficient to unbalance the bridge circuit causing more current to flow through one portion of the bridge circuit.

This change in current flow may be amplified in one or more additional stages of amplification. A load relay is normally energized by the final amplifier. With a vehicle in the area the null position is again achieved and the bridge balanced and the relay deenergized. Back contacts on the load relay inform the traffic control device of the presence of a vehicle in the observed area.

A more detailed description of the circuit will be found in the next section.

*Bridge Detector*

A description of the preferred embodiment of the invention will be made with reference to FIGURE 6.

The infrared source S is energized from a tuned oscillator circuit generally indicated at O. The modulated infrared energy is directed at the area which may be occupied by the target, in this embodiment a vehicle V. Part of the modulated energy is reflected from vehicle V to the detector cell D. The change in impedance of cell D with incident radiation effects a modulated change in output of amplifier A. The modulated output is compared to a modulated reference potential in the phase detector bridge B, the modulated reference potential being supplied by the oscillator O. In-phase reflection from the focused area or zone is sufficient to cause the bridge to balance and to deenergize the relay LR.

At the bridge a phase lag will normally exist between the reference potential and the receiver output, even with a vehicle in the observed area. This is caused by such things as the lag between the output of the incandescent infrared source and its input, the time required for the energy to be emitted from the source, travel to the target, and be reflected to the cell, and the response time of the cell. To compensate for this, capacitor C1 is tuned to bring this out-of-phase relationship into phase.

Lack of signal or out-of-phase signal, the result of scatter, dispersion, random reflection, or spurious signal from an extraneous source, causes the bridge to be unbalanced and the relay to be energized. Normally, with no vehicle in the target area, the bridge is unbalanced and the relay energized. With a vehicle in the area differences in phase angle between the reference potential and the potential received from the amplifier become small and permit the bridge circuit to balance, causing the relay to deenergize. Deenergization of load relay LR permits back contacts on the relay to signal the intersection traffic signal controller that a vehicle is in or is passing through the target area. A steady signal indicates that a vehicle has stopped in the area; an intermittent signal indicates that a vehicle is passing through the area.

Figure 6:
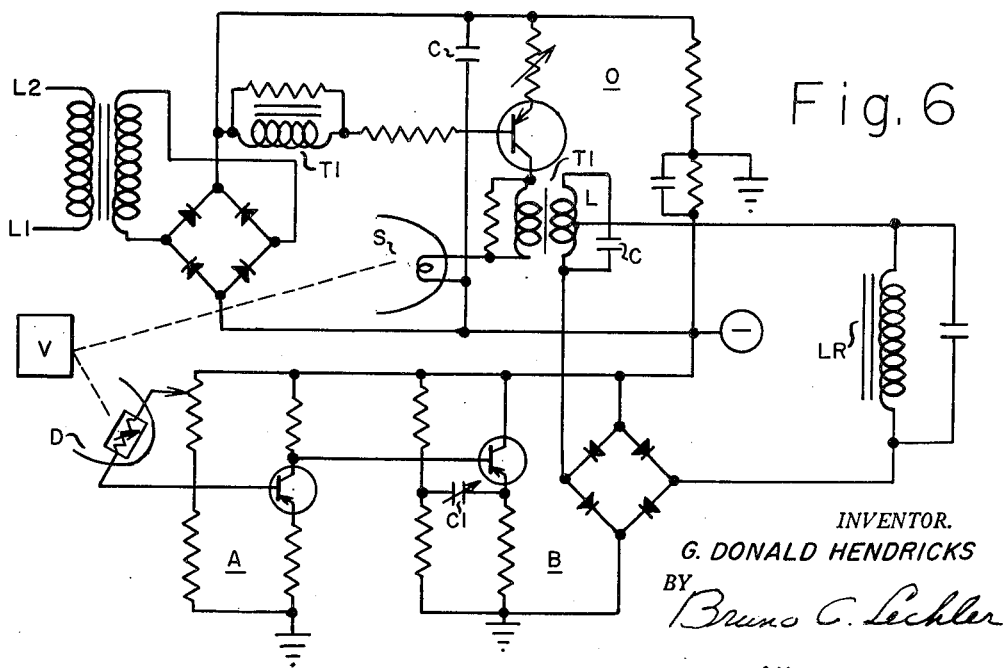
FIGURE 6 is a wiring diagram of the apparatus shown in FIGURE 5.

The circuits employed in the form of the invention disclosed in FIGURE 6 are well known in the art and could be built by one skilled in the art without further explanation.

*Detector Mounting Methods*

Various methods of mounting the detector units are illustrated in FIGURES 7, 8, and 9. In each method the detector units are located so that they obtain a clear view of the target area and are mounted at a height or distance to physically clear all traffic. The umbra of the zone of detection is stopped short of the pavement to help prevent spurious radiation from triggering the detector. The zone of detection, shown as a dark area in the illustrations, is kept approximately three feet from the surface of the pavement to permit detection of the lowest automobile and to prevent detection of pavement ambients.

In FIGURE 7, a cross sectional view of a width of street is indicated at TS. The inbound lane IL is the detected lane leading to a street intersection. The outbound lane OL is not detected because its traffic is moving away from the intersection. A standard STD is mounted at the side of the pavement and carries a mast arm MA at its top. Mast arm MA carries the detector unit D2 which is focused down on the path of traffic. Conductors connecting the detector unit D2 to the intersection traffic controller (not shown) may be pulled through the standard STD and the mast arm MA.

The detector unit D2 contains an infrared emitter located at the left end of the housing and an infrared detector located at the right end of the housing. The emitter and receiver are thus spaced some distance apart. The cone defining the area which receives infrared radiation from the transmitter optic system is shown by dashed lines TR representing an emitted radiation beam. The cone defining the limits of the space from which reflected radiation could reach the detector through the optic pickup system is shown by dashed lines XR representing the space of sight for the receiver. The axes of beam and sight are angularly disposed to at least approximate intersection to provide an area or volume of overlap as shown by the darkened area Z. It will be noted that at street level ST there is no area which both receives and reflects infrared radiation. However, at a higher elevation corresponding to the top of a vehicle the area defined by the two cones coincides. Thus, a vehicle will actuate the detector but reflection from the pavement will not. The zone is sufficiently wide and is located transversely in the street to detect all traffic passing in that lane including traffic which may inadvertently pass near the edges of the lane. The zone is sufficiently short (lengthwise with the lane) so that vehicles following one another in close proximity will still be registered individually.

Thus, the detector unit is effective to register the presence and/or movement of vehicles passing or stopped within its range.

In FIGURE 8, a sectional view of a width of four lane highway is indicated at HY. The inbound lanes IL1, IL2 are the detected lanes leading to a highway intersection. The outbound lanes OL1, OL2 are not detected because their traffic is moving away from the intersection. In future controllers, traffic may be counted moving away from the intersection; then, detectors would be mounted over outbound lanes OL1, OL2.

Standards STD are mounted at each side of the highway HY to support a cable CB across the roadway. Cable CB supports detector units D3, D4 which are located above and focused toward lanes IL1, IL2. Conductors connecting each detector unit to the intersection traffic controller (not shown) may be pulled through the standard STD and supported by cable CB.

The limits of the cones of transmitted energy are represented by dashed lines. The limits of the area of reflected energy as determined by the optic system and apertures therein are also represented by dashed lines. The zone of detection is represented by the dark area Z. Again, the zone of detection ends some distance from the detector units D3, D4 and from the surface of the highway HY. The zones are sufficiently wide and are located laterally in the lanes to detect all traffic passing in each lane. If traffic stays reasonably within its lane it will not trigger the detector in the other lane. Again, the zone is sufficiently short, lengthwise with the lane, to permit vehicles traveling closely in file to be registered individually.

FIGURE 9 discloses two methods of mounting the detectors to reduce the cost of mounting. The detector D5 for inbound traffic on lane IL is mounted directly on a standard STD of intermediate height. This mounting system permits the detector to "see" over parked cars. The detector D6 for outbound traffic on lane OL is mounted on a post P and is directed across the highway lane OL. This may be the most economical mounting system and would find usage on highways along which parking is prohibited.

The electric cables between the traffic controller and the detectors would be installed and protected in the usual manner for this type of apparatus.

*Pedestrian Detector*

One form of the invention as used with a pedestrian detecting and counting system is shown in FIGURE 10. The device is intended for use with a pedestrian actuated traffic signal controller adapted to time a pedestrian interval proportional to the number of pedestrians waiting in a prescribed area designating which street they desire to cross. Such a density type pedestrian actuated controller may be of the type having a pedestrian actuated phase and may have an exclusive pedestrian interval.

The infrared detector disclosed herein is effective in detecting persons as well as vehicles. Detector D7 is mounted on a short mast arm MA1 attached to standard STD. Detector D7 is located above the pedestrian path bounded by guard rail G, and serves to detect persons entering the area prescribed for cross walk traffic. The optic system in the detector unit D7 is adjusted to detect persons walking under it, and is unaffected by ambient conditions. Its zone of detection ends above the surface of the sidewalk.

Detector D8 is used to detect vehicular traffic in the right turn lane adjacent to the sidewalk. It supplies vehicle information to the intersection traffic controller. Information from these and other detectors (not shown) is utilized by the density type traffic controller to allocate time for the pedestrians to cross the cross street while holding up traffic turning off the main street into the path of pedestrians.

Detector D9 is used to detect pedestrians entering the area prescribed for those desiring to cross the main street. Information from the detector is fed to the intersection traffic controller where it serves to determine the duration of the Walk signal across the main street. Calls from detector D8 are used to determine the duration of the right turn arrow signal. The illumination of the right turn arrow may be delayed from the beginning of the cross street green signal in proportion to the number of pedestrians waiting to cross the main street. This refinement is necessary because the two movements are in conflict.

Thus it is seen that the invention as hitherto disclosed is generally adapted to observing a traffic path—whether it be a sidewalk or other place of pedestrian traffic, or a highway lane for vehicular traffic.

These and other features may be included in future controllers now that a satisfactory vehicle and pedestrian detector has been disclosed.

I claim:
1. A traffic detector system for observing traffic on a surface in an established path comprising: an emitter directing a beam of infrared radiation upon a portion of said surface; low frequency oscillator modulating means providing an output energizing said emitter whereby said radiation is modulated; an infrared sensitive receiving device sighted upon a portion of said surface adjacent to the first said portion; the beam and sight axes being approximately intersecting in space away from said surface, thereby to provide a zone of beam and sight overlap spaced from but located relative to said surface so as to be entered by objects of traffic intended to be observed in said path; a load to be actuated in accordance with traffic in said path; and means including amplifying means and phase detecting means for accepting and comparing outputs of said oscillator modulating means and said device to provide a signal actuating said load, in response to an object which has entered said beam and sight.

2. A traffic detector system for observing traffic on a surface in an established path comprising: an emitter directing a beam of infrared radiation upon a portion of said surface; low frequency oscillator modulating means providing an output energizing said emitter whereby said radiation is modulated; an infrared sensitive receiving device sighted upon a portion of said surface adjacently and angularly to the beam, whereby an object of the traffic intended to be observed in said path will at some one time be in both beam and sight; a load to be actuated in accordance with traffic in said path; and means including amplifying means and phase detecting means for accepting and comparing outputs of said oscillator modulating means and said device to provide a signal actuating said load, in response to an object which has entered said beam and sight.

References Cited in the file of this patent

UNITED STATES PATENTS

| | | |
|---|---|---|
| 1,791,938 | Schroeter | Feb. 10, 1931 |
| 1,838,371 | Deardorff | Dec. 29, 1931 |
| 1,936,514 | Lengnick | Nov. 21, 1933 |
| 2,237,193 | Mobsby | Apr. 1, 1941 |
| 2,454,841 | Sackville | Nov. 30, 1948 |
| 2,572,494 | Krieger et al. | Oct. 23, 1951 |
| 2,622,140 | Muller | Dec. 16, 1952 |
| 2,721,275 | Jackson | Oct. 18, 1955 |
| 2,788,452 | Strenglass | Apr. 9, 1957 |
| 2,856,540 | Warshaw | Oct. 14, 1958 |

FOREIGN PATENTS

| | | |
|---|---|---|
| 888,847 | France | Sept. 20, 1943 |
| 709,790 | Great Britain | June 2, 1954 |